United States Patent
Xu et al.

(10) Patent No.: US 11,956,074 B2
(45) Date of Patent: Apr. 9, 2024

(54) PHYSICAL DOWNLINK CONTROL CHANNEL (PDCCH) PARAMETERS FOR MULTIPLE CELL GROUPS

(71) Applicant: QUALCOMM Incorporated, San Diego, CA (US)

(72) Inventors: Huilin Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 16/949,930

(22) Filed: Nov. 20, 2020

(65) Prior Publication Data

US 2021/0211226 A1    Jul. 8, 2021

Related U.S. Application Data

(60) Provisional application No. 62/956,464, filed on Jan. 2, 2020.

(51) Int. Cl.
*H04W 72/00*  (2023.01)
*H04L 1/00*   (2006.01)
(Continued)

(52) U.S. Cl.
CPC ............ *H04L 1/0038* (2013.01); *H04W 8/24* (2013.01); *H04W 72/0453* (2013.01); *H04W 72/23* (2023.01); *H04W 84/18* (2013.01)

(58) Field of Classification Search
None
See application file for complete search history.

(56) References Cited

U.S. PATENT DOCUMENTS

2016/0227524 A1  8/2016  Choi et al.
2019/0349155 A1  11/2019  Xu et al.
(Continued)

FOREIGN PATENT DOCUMENTS

EP    3247061 A1    11/2017
EP    3726904 A1    10/2020
(Continued)

OTHER PUBLICATIONS

International Search Report and Written Opinion—PCT/US2020/070813—ISA/EPO—dated Mar. 11, 2021.
(Continued)

*Primary Examiner* — Abdelillah Elmejjarmi
(74) *Attorney, Agent, or Firm* — Arun Swain

(57) ABSTRACT

This disclosure provides systems, methods and apparatuses for identifying physical downlink control channel (PDCCH) parameters, such as a PDCCH blind decode limit and a PDCCH control channel element limit, for implementations where a user equipment (UE) is configured with two or more cell groups. The techniques described herein permit the UE or a base station to determine the quantity of cell groups that is to be considered when determining the PDCCH parameters, permit the UE to indicate PDCCH capability values across multiple frequency ranges, and permit the base station to schedule a quantity of PDCCHs for the UE that results in a quantity of blind decodes that exceeds a PDCCH blind decode limit or a quantity of control channel elements that exceeds a PDCCH control channel element limit.

30 Claims, 7 Drawing Sheets

(51) Int. Cl.
*H04W 8/24* (2009.01)
*H04W 72/0453* (2023.01)
*H04W 72/23* (2023.01)
*H04W 84/18* (2009.01)

(56) References Cited

U.S. PATENT DOCUMENTS

| | | | | |
|---|---|---|---|---|
| 2020/0221522 A1* | 7/2020 | Shimezawa | ............ | H04W 76/15 |
| 2020/0314678 A1* | 10/2020 | Lee | ........................ | H04W 72/12 |
| 2021/0144746 A1* | 5/2021 | Ji | ........................... | H04W 72/23 |
| 2022/0030568 A1* | 1/2022 | Behravan | ................... | H04L 5/00 |
| 2022/0150734 A1* | 5/2022 | Nimbalker | ............ | H04W 72/23 |

FOREIGN PATENT DOCUMENTS

| | | | | |
|---|---|---|---|---|
| KR | 20200112583 | * | 10/2020 | ............... H04L 5/00 |
| KR | 20200112583 A | * | 10/2020 | ............... H04L 5/00 |
| WO | WO2020165156 A1 | * | 8/2020 | ............... H04L 5/00 |
| WO | 2021016046 A1 | | 1/2021 | |

OTHER PUBLICATIONS

Samsung: "Introduction of MIMO Enhancements in NR", 3GPP Draft, RP-193127, 3GPP TSG RAN Meeting #86, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9-Dec. 12, 2019, Dec. 10, 2019 (Dec. 10, 2019), XP051838954, 52 Pages, Retrieved from the Internet: URL:https://ftp.3gpp.org/tsg_ran/TSG_RAN/TSGR_86/Docs/RP-193127.zip, RP-193127-CR 38.213, MIMO-Core.docx, [retrieved on Dec. 10, 2019].

* cited by examiner

PHYSICAL DOWNLINK CONTROL CHANNEL (PDCCH) PARAMETERS FOR MULTIPLE CELL GROUPS

CROSS-REFERENCE TO RELATED APPLICATION

This Patent Applications claims priority to U.S. Provisional Patent Application No. 62/956,464, filed on Jan. 2, 2020, entitled "PHYSICAL DOWNLINK CONTROL CHANNEL (PDCCH) PARAMETERS FOR MULTIPLE CELL GROUPS," and assigned to the assignee hereof. The disclosure of the prior Application is considered part of and is incorporated by reference into this Patent Application.

TECHNICAL FIELD

Aspects of the present disclosure relate generally to wireless communication and more particularly to techniques for identifying physical downlink control channel (PDCCH) parameters for multiple cell groups.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include identifying a physical downlink control channel (PDCCH) blind decode capability value and a PDCCH control channel element capability value. The method may include determining (which may include selecting) a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE.

In some aspects, the UE is configured with a plurality of cell groups that includes a master cell group and a secondary cell group. In some aspects, the UE is configured with a plurality of cell groups that includes a master cell group and a plurality of secondary cell groups. In some aspects, the method includes transmitting a single PDCCH blind decode capability value across a plurality of frequency ranges in each cell group. In some aspects, the UE is configured with a plurality of cell groups that includes a master cell group and at least two secondary cell groups, and the method includes transmitting a respective PDCCH blind decode capability value for each of a plurality of frequency ranges in each cell group.

In some aspects, the method includes transmitting a respective PDCCH blind decode capability value for each of a plurality of frequency ranges, where in each of the plurality of frequency ranges the UE is configured with at least one downlink serving cell included in a cell group of a plurality of cell groups configured for the UE, each respective PDCCH blind decode capability value for each of the plurality of frequency ranges is a same PDCCH blind decode capability value, and the same PDCCH blind decode capability value is to be used across all frequency ranges in the cell group. In some aspects, the UE is configured with a plurality of cell groups that includes a master cell group and a plurality of secondary cell groups, and cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

In some aspects, the UE is configured with a plurality of cell groups that includes a master cell group and a plurality of secondary cell groups, and only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit. In some aspects, only a primary cell of the master cell group is permitted to be configured with a quantity of PDCCHs that corresponds to a quantity of blind decodes that exceeds the PDCCH blind decode limit or a quantity of control channel elements that exceeds the PDCCH control channel element limit.

In some aspects, the UE is configured with a plurality of cell groups that includes a master cell group and a plurality of secondary cell groups, and the master cell group and the plurality of secondary cell groups are not permitted to be configured with a quantity of PDCCHs that corresponds to a quantity of blind decodes that exceeds the PDCCH blind decode limit or a quantity of control channel elements that exceeds the PDCCH control channel element limit. In some aspects, the UE is configured with a plurality of cell groups that includes a master cell group and a plurality of secondary cell groups, and the method includes receiving an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Another innovative aspect of the subject matter described in this disclosure can be implemented in a UE for wireless communication. The UE may include a processing system. The processing system may be configured to identify a PDCCH blind decode capability value and a PDCCH control channel element capability value. The processing system may be configured to determine (which may include selecting) a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE. In some aspects, the apparatus of the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the UE to identify a PDCCH blind decode capability value and a PDCCH control channel element capability value. The one or more instructions, when executed by one or more processors of the UE, may cause the UE to determine (which may include selecting) a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for identifying a PDCCH blind decode capability value and a PDCCH control channel element capability value. The apparatus may include means for determining (which may include selecting) a PDCCH blind decode limit and a PDCCH control channel element limit associated with the PDCCH blind decode capability value, the PDCCH control channel element capability value, and a quantity of cell groups configured for the apparatus or a quantity of the cell groups that are activated for the apparatus. In some aspects, the apparatus may perform or implement any one or more of the aspects described in connection with the method, above or elsewhere herein.

Another innovative aspect of the subject matter described in this disclosure can be implemented in a method of wireless communication performed by an apparatus of a UE. The method may include determining (which may include selecting) a respective reference quantity of cells for each cell group configured for the UE, where the UE is configured with more than two cell groups. The method may include determining (which may include selecting) a respective PDCCH blind decode limit and a respective PDCCH control channel element limit for each cell group configured for the UE, associated with the respective reference quantity of cells for each cell group configured for the UE.

In some aspects, the method includes transmitting an indication of a respective upper limit for the respective reference quantity of cells for each cell group configured for the UE. In some aspects, determining (which may include selecting) the respective upper limit for the respective reference quantity of cells for each cell group configured for the UE includes selecting the respective upper limit for the reference quantity of cells for each cell group from an upper limit range configured for the UE, where the upper limit range is associated with a combined PDCCH blind decode capability value if reported by the UE for carrier aggregation with more than four configured cells, otherwise the upper limit range is associated with a specified value.

In some aspects, determining (which may include selecting) the respective upper limit for the respective reference quantity of cells for each cell group configured for the UE includes determining (which may include selecting) the respective upper limit for the respective reference quantity of cells for each cell group configured for the UE such that a summation of the respective upper limits for the respective reference quantity of cells for each cell group is greater than or equal to a combined PDCCH blind decode capability value for the UE or a quantity of downlink serving cells that the UE is capable of supporting across all cell groups configured for the UE. In some aspects, determining (which may include selecting) the respective reference quantity of cells for each cell group configured for the UE includes selecting the respective reference quantity of cells for each cell group from a cell quantity range specified for the UE.

In some aspects, determining (which may include selecting) the respective reference quantity of cells for each cell group configured for the UE includes determining (which may include selecting) the respective reference quantity of cells for each cell group such that a summation of the respective reference quantities of cells for each cell group is less than or equal to a combined PDCCH blind decode capability value for the UE or a quantity of downlink serving cells configured for the UE across all cell groups configured for the UE. In some aspects, cells included in a set of cells configured for the UE are time synchronous within the cell set.

In some aspects, cells included in a set of cells configured for the UE are time asynchronous with cells included in a second set of cells configured for the UE. In some aspects, the respective PDCCH blind decode limit for each cell set configured for the UE are associated with the reference quantity of cells and an upper limit of the reference quantity of cells defined for a cell group, and the respective PDCCH control channel element limit for each cell set configured for the UE are associated with the reference quantity of cells and the upper limit of the reference quantity of cells defined for a cell group. In some aspects, the PDCCH blind decode limit and the PDCCH control channel element limit for a cell group are for a set of cells during a handover procedure of the UE when the UE is simultaneously connected to more than two set of groups.

Another innovative aspect of the subject matter described in this disclosure can be implemented in a UE for wireless communication. The UE may include a processing system. The processing system may be configured to determine (which may include selecting) a respective reference quantity of cells for each cell group configured for the UE, where the UE is configured with more than two cell groups. The processing system may be configured to determine (which may include selecting) a respective PDCCH blind decode limit and a respective PDCCH control channel element limit for each cell group configured for the UE, associated with the respective reference quantity of cells for each cell group configured for the UE. In some aspects, the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the UE to determine (which may include selecting) a respective reference quantity of cells for each cell group configured for the UE, where the UE is configured with more than two cell groups. The one or more instructions, when executed by one or more processors of a UE, may cause the UE to determine (which may include selecting) a respective PDCCH blind decode limit and a respective PDCCH control channel element limit for each cell group configured for the UE, associated with the respective reference quantity of cells for each cell group configured for the UE. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for determining (which may include selecting) a respective reference quantity of cells for each cell group configured for the apparatus, where the apparatus is configured with more than two cell groups. The apparatus may include means for determining (which may include selecting) a respective PDCCH blind decode limit and a respective PDCCH control channel element limit for each cell group configured for the apparatus, associated with the respective reference quantity of cells for each cell group configured for the apparatus. In some aspects, the apparatus may perform or implement any one or more of the aspects described in connection with the method, above or elsewhere herein.

Another innovative aspect of the subject matter described in this disclosure can be implemented in a method of wireless communication performed by a base station (BS). The method may include receiving a PDCCH blind decode capability value and a PDCCH control channel element capability value for a UE. The method may include determining (which may include selecting) a PDCCH blind decode limit and a PDCCH control channel element limit for the UE associated with the PDCCH blind decode capability value, the PDCCH control channel element capability value, and a quantity of cell groups configured for the UE or a quantity of the cell groups that are activated for the UE.

In some aspects, the UE is configured with a plurality of cell groups that includes a master cell group and a secondary cell group. In some aspects, the UE is configured with a plurality of cell groups that includes a master cell group and a plurality of secondary cell groups. In some aspects, the method includes receiving, from the UE, a single PDCCH blind decode capability value across a plurality of frequency ranges in each cell group. In some aspects, the UE is configured with a plurality of cell groups that includes a master cell group and at least two secondary cell groups, and the method includes receiving, from the UE, a respective PDCCH blind decode capability value for each of a plurality of frequency ranges in each cell group.

In some aspects, the method includes receiving, from the UE, a respective PDCCH blind decode capability value for each of a plurality of frequency ranges, where in each of the plurality of frequency ranges the UE is configured with at least one downlink serving cell included in a cell group of a plurality of cell groups configured for the UE, each respective PDCCH blind decode capability value for each of the plurality of frequency ranges is a same PDCCH blind decode capability value, and the same PDCCH blind decode capability value is to be used across all frequency ranges in the cell group. In some aspects, the UE is configured with a plurality of cell groups that includes a master cell group and a plurality of secondary cell groups, and cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

In some aspects, the UE is configured with a plurality of cell groups that includes a master cell group and a plurality of secondary cell groups, and only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit. In some aspects, only a primary cell of the master cell group is permitted to be configured with a quantity of PDCCHs that corresponds to a quantity of blind decodes that exceeds the PDCCH blind decode limit or a quantity of control channel elements that exceeds the PDCCH control channel element limit.

In some aspects, the UE is configured with a plurality of cell groups that includes a master cell group and a plurality of secondary cell groups, and the master cell group and the plurality of secondary cell groups are not permitted to be configured with a quantity of PDCCHs that corresponds to a quantity of blind decodes that exceeds the PDCCH blind decode limit or a quantity of control channel elements that exceeds the PDCCH control channel element limit. In some aspects, the UE is configured with a plurality of cell groups that includes a master cell group and a plurality of secondary cell groups, and the method includes transmitting, to the UE, an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Another innovative aspect of the subject matter described in this disclosure can be implemented in an apparatus of a BS for wireless communication. The apparatus of the BS may an interface and a processing system. The interface may be configured to obtain a PDCCH blind decode capability value and a PDCCH control channel element capability value for a UE. The processing system may be configured to determine (which may include selecting) a PDCCH blind decode limit and a PDCCH control channel element limit for the UE associated with the PDCCH blind decode capability value, the PDCCH control channel element capability value, and a quantity of cell groups configured for the UE or a quantity of the cell groups that are activated for the UE. In some aspects, the BS may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to receive a PDCCH blind decode capability value and a PDCCH control channel element capability value for a UE. The one or more instructions, when executed by one or more processors of a BS, may cause the one or more processors to determine (which may include selecting) a PDCCH blind decode limit and a PDCCH control channel element limit for the UE associated with the PDCCH blind decode capability value, the PDCCH control channel element capability value, and a quantity of cell groups configured for the UE or a quantity of the cell groups that are activated for the UE. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for receiving a PDCCH blind decode capability value and a PDCCH control channel element capability value for a UE. The apparatus may include means for determining (which may include selecting) a PDCCH blind decode limit and a PDCCH control channel element limit for the UE associated with the PDCCH blind decode capability value, the PDCCH control channel element capability value, and a quantity of cell groups configured for the apparatus or a quantity of the cell groups that are activated for the apparatus. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, interface, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

Like reference numbers and designations in the various drawings indicate like elements.

DETAILED DESCRIPTION

Figure 1:
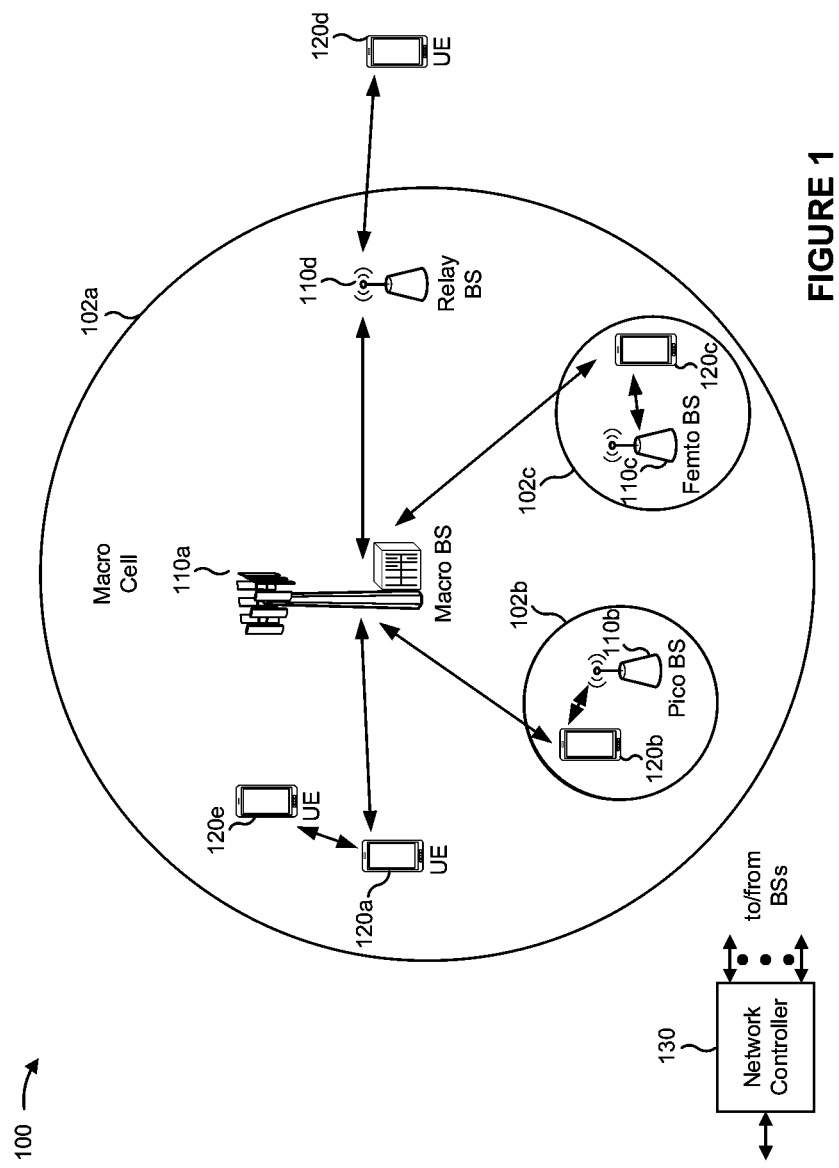
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Physical downlink control channel (PDCCH) parameters may be specified for a user equipment (UE). The PDCCH parameters may include a PDCCH blind decode limit, a PDCCH control channel element limit, as well as other PDCCH parameters that dictate how the UE performs PDCCH processing. A PDCCH blind decoding limit may identify a quantity of blind decodes that the UE is to perform in a PDCCH slot or a particular span of PDCCH symbols. A blind decode may refer to decoding a symbol without knowing whether the symbol actually carries any information (control information or data information). A PDCCH control channel element limit may similarly identify a particular quantity of control channel elements that the UE is to process in a PDCCH slot or a particular span of PDCCH symbols. The quantities identified by the PDCCH blind decode limit and the PDCCH control channel element limit may be configured to limit or reduce the signal processing burden of the UE.

In some cases, a UE may be configured with multiple cell groups. New Radio (NR) dual connectivity may refer to a deployment where a UE is configured with two cell groups, which may be referred to as a master cell group and a secondary cell group. Each cell group may include one or more cells, such as a primary cell (or serving cell) and a secondary cell. NR multi-connectivity may refer to a deployment where the UE is configured with more than two cell groups. In this case, the UE may be configured with: a master cell group and multiple secondary cell groups; multiple master cell groups and one or more secondary cell groups; in addition to other configuration combinations.

A UE that is deployed in a dual-connectivity configuration or a multi-connectivity configuration may experience challenges in selecting, determining, identifying, or configuring PDCCH parameters, such as those described above. For example, the UE may be unable to select or determine which cell groups are to be considered when selecting or determining a PDCCH blind decode limit and a PDCCH control channel element limit for the UE. As another example, the UE may be unable to select or determine how to indicate PDCCH parameters if the UE is capable of communicating across multiple frequency ranges (for example, a 5G frequency range 1 (FR1 or a sub-6 gigahertz frequency range), a 5G frequency range 2 (FR2 or millimeter wave frequency range), as well as other frequency ranges). As another example, one or more base stations communicatively connected with the UE (such as a serving cell base station) may be unable to select or determine whether the base station is permitted to overbook the UE by configuring the UE with a PDCCH configuration that results in a quantity of blind decodes and a quantity of control channel elements that are not supported by the PDCCH parameters selected or determined by the UE.

Some aspects described herein provide techniques and apparatuses for identifying PDCCH parameters, such as a PDCCH blind decode limit and a PDCCH control channel element limit, for implementations where a UE is configured with multiple (two or more) cell groups.

Particular implementations of the subject matter described in this disclosure can be implemented to realize one or more of the following potential advantages. The techniques described herein may permit the UE to select or determine the quantity of cell groups that is to be considered when selecting or determining the PDCCH parameters, which may increase the accuracy of the PDCCH parameters. The techniques described herein may permit the UE to indicate PDCCH parameters across multiple frequency ranges, which may increase the flexibility of the UE to signal the PDCCH parameters. The techniques described herein may permit different cell groups, different types of cell groups, or other configurations of cell groups (or cells within a cell group) to be configured with a quantity of PDCCH candidates that correspond to quantity of blind decodes that exceeds a PDCCH blind decode limit, which may increase the flexibility of PDCCH configurations for the UE. The techniques described herein also may permit different cell groups, different types of cell groups, or other configurations of cell groups (or cells within a cell group) to be configured with a quantity of PDCCH candidates that exceeds a PDCCH control channel element limit of the UE, which may increase the flexibility of PDCCH configurations for the UE.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (such as 5 to 40 Watts or another example) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
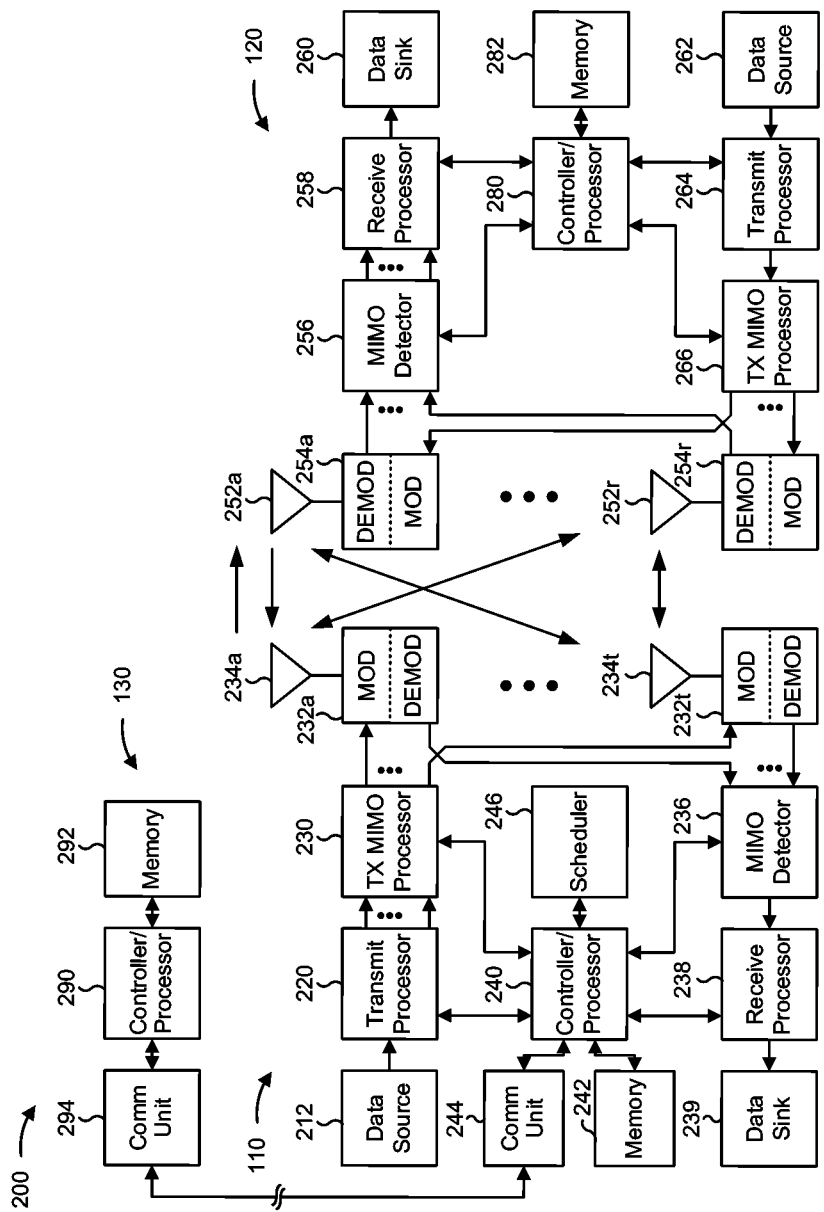
FIG. 2 is a diagram illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with identifying PDCCH parameters for multiple cell groups, as described in more detail elsewhere herein. For example, the controller/processor 240 of base station 110, the controller/processor 280 of UE 120, or any other component(s) (or combinations of components) of FIG. 2 may perform or direct operations of, for example, process 500 of FIG. 5, process 600 of FIG. 6, or other processes as described herein. The memories 242 and 282 may store data and program codes for base station 110 and UE 120, respectively. A scheduler 246 may schedule UEs for data transmission on the downlink, the uplink, or a combination thereof.

Figure 5:
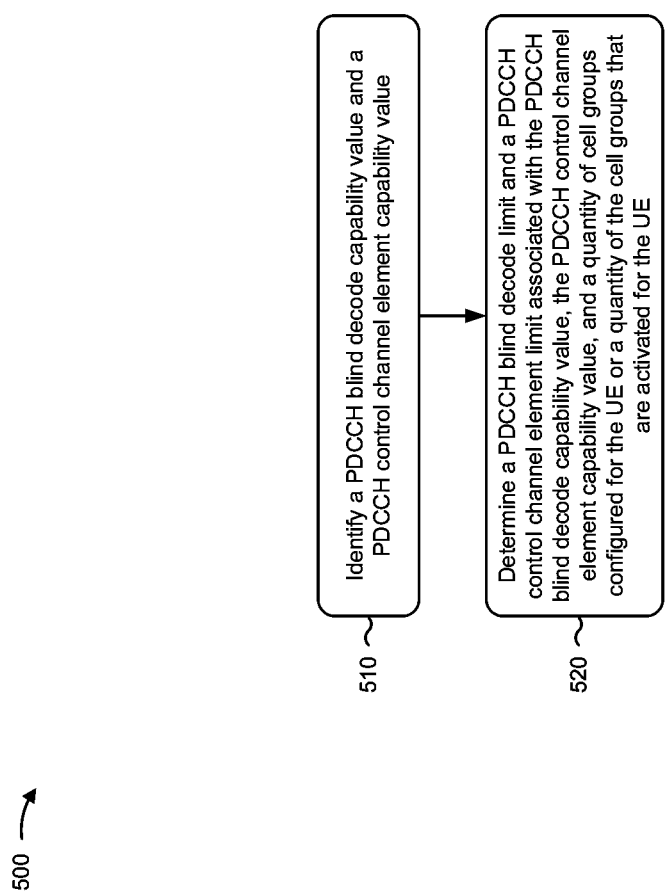
FIGS. 5 and 6 are diagrams illustrating an example processes performed, for example, by a UE.
Figure 6:
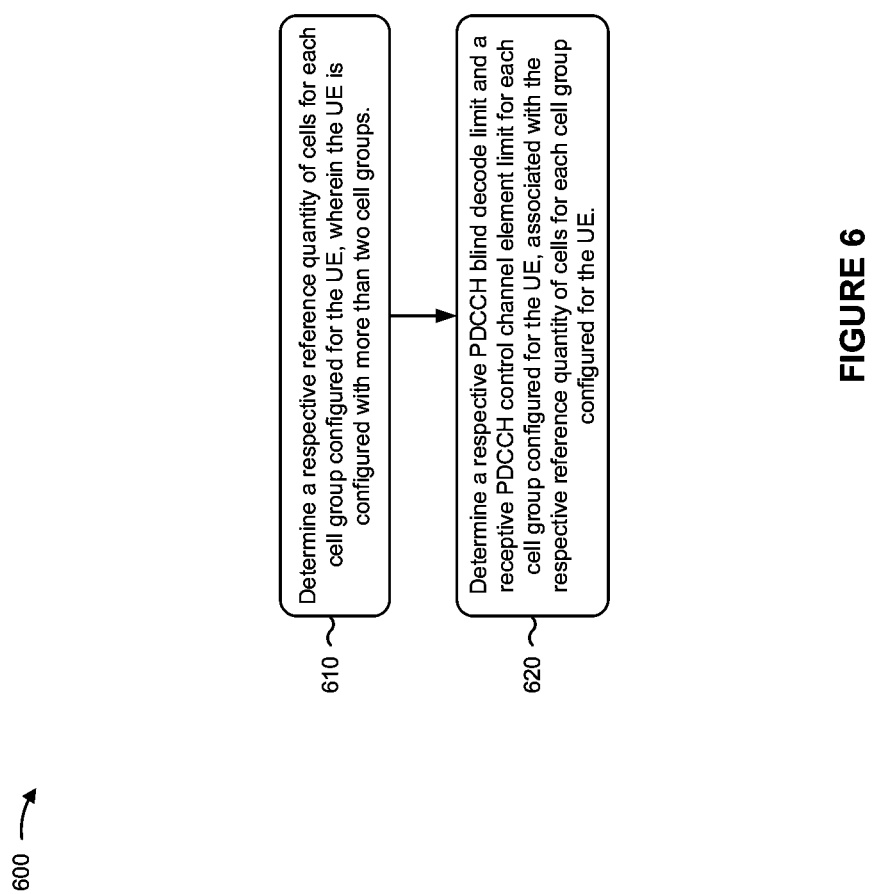
Figure 7:
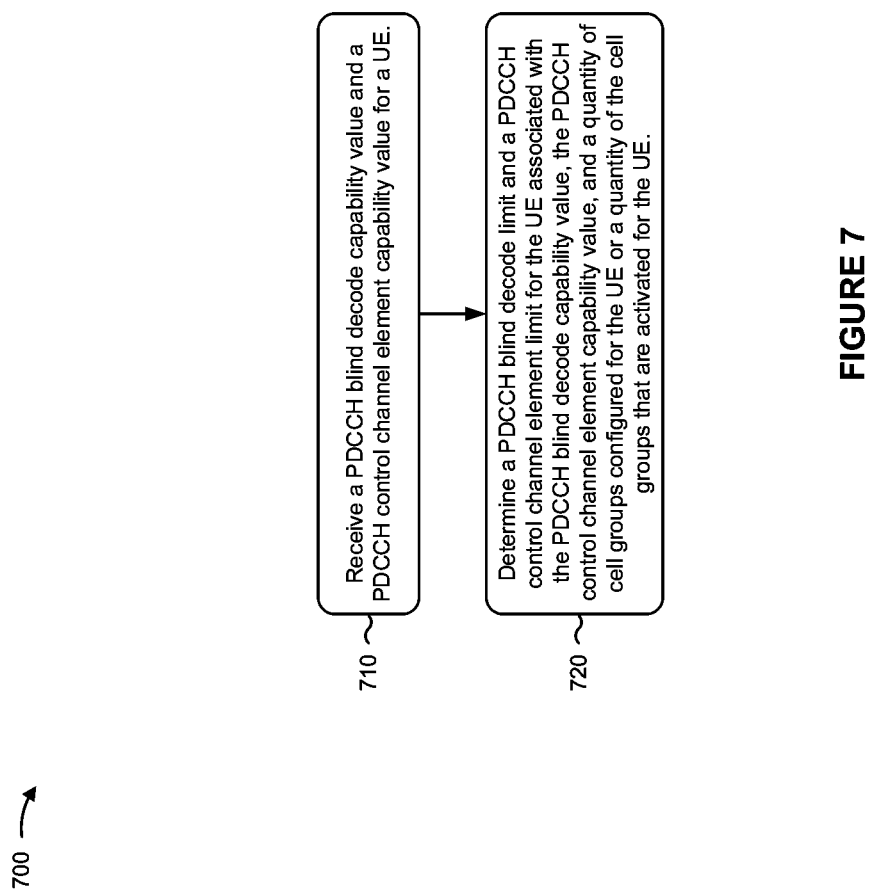
FIG. 7 is a diagram illustrating an example process performed, for example, by a BS.

The stored program codes, when executed by the controller/processor 280 or other processors and modules at UE 120, may cause the UE 120 to perform operations described with respect to process 500 of FIG. 5, process 600 of FIG. 6, process 700 of FIG. 7, or other processes as described herein. The stored program codes, when executed by the controller/processor 240 or other processors and modules at base station 110, may cause the base station 110 to perform operations described with respect to process 500 of FIG. 5, process 600 of FIG. 6, process 700 of FIG. 7, or other processes as described herein. A scheduler 246 may schedule UEs for data transmission on the downlink, the uplink, or a combination thereof.

In some aspects, UE 120 may include means for identifying a PDCCH blind decode capability value for the UE 120 and a PDCCH control channel element capability value for the UE 120, means for determining (which may include selecting) a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE, or combinations thereof. In some aspects, UE 120 may include means for determining (which may include selecting) a respective reference quantity of cells for each cell group configured for the UE, where the UE is configured with more than two cell groups, means for determining (which may include selecting) a respective PDCCH blind decode limit and a respective PDCCH control channel element limit for each cell group configured for the UE, associated with the respective reference quantity of cells for each cell group configured for the UE, or combinations thereof. In some aspects, such means may include one or more components of UE 120 described in connection with FIG. 2.

In some aspects, a base station 110 may include receiving a PDCCH blind decode capability value and a PDCCH control channel element capability value for a UE 120, means for determining (which may include selecting) a PDCCH blind decode limit and a PDCCH control channel element limit for the UE 120 associated with the PDCCH blind decode capability value, the PDCCH control channel element capability value, and a quantity of cell groups configured for the UE 120 or a quantity of the cell groups that are activated for the UE 120, or combinations thereof.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
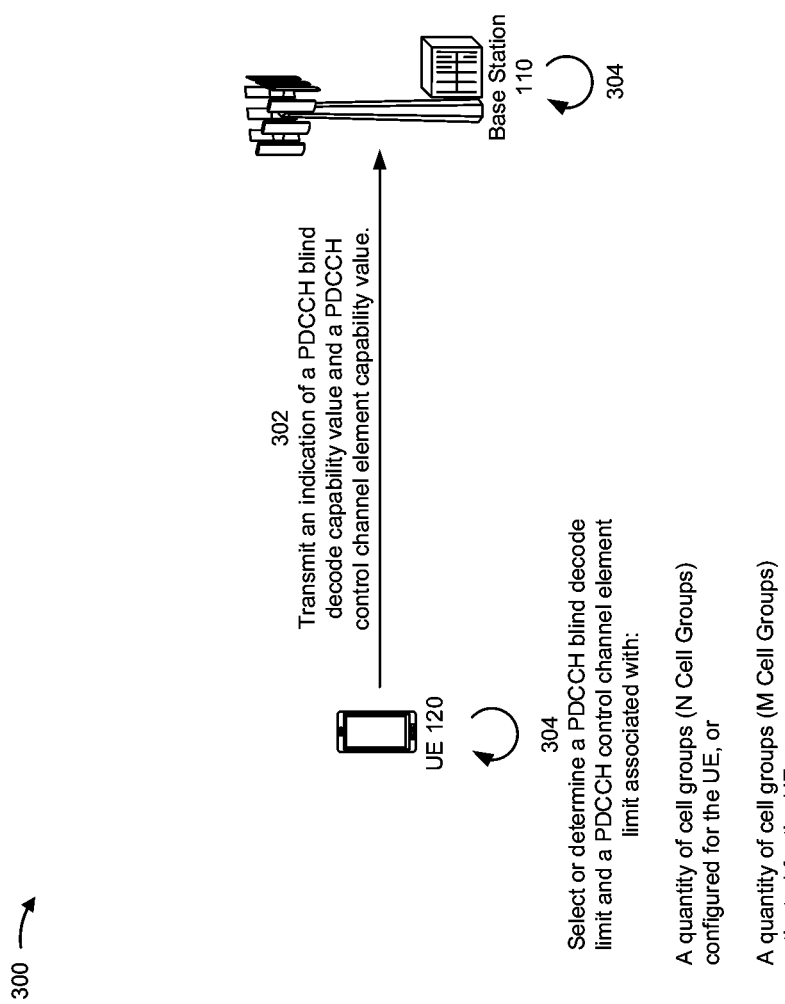
FIGS. 3 and 4 are diagrams illustrating examples of indicating physical downlink control channel (PDCCH) parameters for multiple cell groups.

FIG. 3 is a diagram illustrating one or more examples 300 of identifying PDCCH parameters for multiple cell groups. As shown in FIG. 3, example(s) 300 may include communication between a UE 120 (such as the UEs 120a-120e depicted and described in FIG. 1 or the UE 120 depicted and described in FIG. 2) and a base station 110 (such as the BSs 110a-110d depicted and described in FIG. 1 or the BS 110 depicted in FIG. 2). The UE 120 and the base station 110 may be included in a wireless network, such as wireless network 100. In some aspects, the UE 120 may be capable of being deployed in an NR dual-connectivity configuration or an NR multi-connectivity configuration. For example, the UE 120 may be configured with multiple cell groups, such as one or more master cell groups and one or more secondary cell groups. Each cell group may include one or more cells, such as one or more primary cells and one or more secondary cells. In some aspects, the cells within each cell group configured for the UE 120 may be time synchronous within each cell group, may be time asynchronous across two or more cell groups, or combinations thereof.

As shown in FIG. 3, and by reference number 302, the UE 120 may identify and transmit an indication of a PDCCH blind decode capability value for the UE 120 and a PDCCH control channel element capability value for the UE 120 to the base station 110. In some aspects, the UE 120 may transmit the indication based at least in part on identifying the PDCCH blind decode capability value and the PDCCH control channel element capability value. In some aspects, the UE 120 may identify the PDCCH blind decode capability value and the PDCCH control channel element value based at least in part on the capability of the UE 120. The PDCCH blind decode capability value may indicate a quantity of blind decodes that the UE 120 is capable of performing in a PDCCH slot or across multiple consecutive PDCCH symbols across the cell groups configured for the UE 120. The PDCCH control channel element capability value may indicate a quantity of control channel element that the UE 120 is capable of processing in a PDCCH slot or across multiple consecutive PDCCH symbols across the cell groups configured for the UE 120.

The UE 120 may transmit the indication in one or more uplink communications, such as one or more uplink control information (UCI) communications, one or more radio resource control (RRC) communications, one or more medium access control (MAC) control element (MAC-CE) communications, or other types of uplink communications.

In some aspects, if the UE 120 is capable of communicating over multiple frequency ranges (such as a 5G FR1 frequency range, a 5G FR2 frequency range, as well as other frequency ranges), the UE 120 may transmit a single PDCCH blind decode capability value and a single PDCCH control channel element capability value across all or a subset of the frequency ranges in each cell group. In some aspects, if the UE 120 is configured with more than two cell groups and is capable of communicating over multiple frequency ranges, the UE 120 may transmit a separate PDCCH blind decode capability values and separate PDCCH control channel element capability values for each of the frequency ranges in each cell group. In this case, the separate PDCCH blind decode capability values may be the same PDCCH blind decode capability value for all of the frequency ranges or a subset of the separate PDCCH blind decode capability values may be different PDCCH blind decode capability values. Similarly, the separate PDCCH control channel element capability values may be the same PDCCH control channel element capability value for all of the frequency ranges or a subset of the separate PDCCH control channel element capability values may be different PDCCH control channel element capability values. In some aspects, if the UE 120 is configured with more than two cell groups and is capable of communicating over multiple frequency ranges, the UE 120 may transmit a separate PDCCH blind decode capability values for each frequency range associated with a downlink serving cell included in each cell group configured for the UE 120, where the separate PDCCH blind decode capability values are the same PDCCH blind decode capability value to be used across all frequency ranges configured for the cell group.

As further shown in FIG. 3, and by reference number 304, the UE 120, the base station 110, or a combination thereof may determine PDCCH parameters for PDCCH processing by the UE 120. Determining the PDCCH parameters may include selecting the PDCCH parameters. The PDCCH parameters may include a PDCCH blind decode limit and a PDCCH control channel element limit. In some aspects, the PDCCH parameters may include other PDCCH processing parameters.

In some aspects, the PDCCH blind decode limit may identify a quantity of blind decodes that the UE 120 is to perform in a PDCCH slot or across multiple consecutive PDCCH symbols across the cell groups configured for the UE 120. In some aspects, the PDCCH blind decode limit may be a combined PDCCH blind decode limit for the UE 120, and the UE 120 may (or the base station 110, or both the UE 120 and the base station 110) determine respective PDCCH blind decode limits for each cell group configured for the UE 120 associated with or based at least in part on the combined PDCCH blind decode limit. Determining the respective PDCCH blind decode limits may include selecting the respective PDCCH blind decode limits.

In some aspects, the PDCCH control channel element limit may identify a quantity of control channel elements that the UE 120 is to process in a PDCCH slot or across multiple consecutive PDCCH symbols across the cell groups configured for the UE 120. In some aspects, the PDCCH control channel element limit may be a combined PDCCH control channel element limit for the UE 120, and the UE 120 (or the base station 110, or both the UE 120 and the base station 110) may determine respective PDCCH control channel element limits for each cell group configured for the UE 120 associated with or based at least in part on the combined PDCCH control channel element limit. Determining the respective PDCCH control channel element limits may include selecting the respective PDCCH control channel element limits.

The UE 120 may (or the base station 110, or both the UE 120 and the base station 110) determine (which may include selecting) the PDCCH blind decode limit and the PDCCH control channel element limit associated with or based at least in part on the cell groups. In some aspects, the UE 120 may (or the base station 110, or both the UE 120 and the base station 110) determine (which may include selecting) the PDCCH blind decode limit and the PDCCH control channel element limit associated with or based at least in part on the PDCCH blind decode capability value for the UE 120 and the PDCCH control channel element capability value for the UE 120, among other factors or parameters, or a combination thereof.

For example, in some aspects, the UE 120 can determine (which may include selecting) the PDCCH blind decode limit and the PDCCH control channel element limit associated with or based at least in part on the total quantity of cell groups configured for the UE 120. In this case, the UE 120 may (or the base station 110, or both the UE 120 and the base station 110) determine (which may include selecting) the PDCCH blind decode limit and the PDCCH control channel element limit for the N cell groups configured for the UE 120 regardless of whether particular cell groups are activated or deactivated at the time of the determination. As another example, in some aspects, the UE 120 is to determine (which may include selecting) the PDCCH blind decode limit and the PDCCH control channel element limit associated with or based at least in part on the quantity of M cell groups, configured for the UE 120, that are activated (for example, activated at the time of the determination). In this case, the quantity of M cell groups may be less than or equal to the quantity of N cell groups configured for the UE 120.

In some aspects, the base station 110 or another entity in the wireless network may configure the UE 120 to determine (which may include selecting) the PDCCH blind decode limit and the PDCCH control channel element limit (for example, for the total quantity of cell groups configured for the UE 120 or for the quantity of activated cell groups). In some aspects, the UE 120 may (or the base station 110, or both the UE 120 and the base station 110) determine (which may include selecting) the PDCCH blind decode limit and the PDCCH control channel element limit for either the total quantity of cell groups configured for the UE 120 or for the quantity of activated cell groups associated with or based at least in part on a capability of the UE 120. The determination or selection may be associated with or based at least in part on a capability to quickly and repeatedly select or determine the quantity of activated cell groups while minimizing latency in the determination. In this case, a less capable UE 120 may determine (which may include selecting) the PDCCH blind decode limit and the PDCCH control channel element limit for the total quantity of cell groups configured for the UE 120 as a simplified solution that requires fewer processing and memory resources, whereas a more capable UE 120 may determine (which may include selecting) the PDCCH blind decode limit and the PDCCH control channel element limit for the quantity of activated cell groups as a more adaptive solution for traffic patterns of the UE 120.

In some aspects, the UE 120 to determine (which may include selecting) the PDCCH blind decode limit and the PDCCH control channel element limit for the total quantity of cell groups configured for the UE 120 or for the quantity of activated cell groups associated with or based at least in part on the total quantity of cell groups configured for the UE 120. For example, the UE 120 may determine (which may include selecting) the PDCCH blind decode limit and the PDCCH control channel element limit for the quantity of activated cell groups based at least in part on determining that the total quantity of cell groups does not satisfy a threshold quantity of cell groups (for example, three or more cell groups). The UE 120 may determine (which may include selecting) the PDCCH blind decode limit and the PDCCH control channel element limit for the total quantity of cell groups configured for the UE 120 based at least in part on determining that the total quantity of cell groups does not satisfy a threshold quantity of cell groups (for example, less than three cell groups).

In some aspects, the UE 120 may determine (which may include selecting) the PDCCH parameters based at least in part on receiving a request (for example, from the base station 110) for an indication of the PDCCH parameters. In some aspects, the UE 120 may (or the base station 110, or both the UE 120 and the base station 110) determine (which may include selecting) the PDCCH parameters in various scenarios, such as in a soft handover or a make-before-break handover, where the UE 120 is simultaneously communicatively connected with one or more source cell groups and one or more target cell groups.

In some aspects, the base station 110 may transmit, to the UE 120, an indication of a PDCCH configuration. In some aspects, the PDCCH configuration may be associated with or based at least in part on the PDCCH blind decode limit and the PDCCH control channel element limit. In some aspects, the PDCCH configuration may configure a quantity of PDCCH candidates for the UE 120 that results in a quantity of blind decodes or a quantity of control channel elements for the UE 120 that exceed or are not supported by the PDCCH blind decode limit and the PDCCH control channel element limit. In some cases, this may be referred to as overbooking. In some aspects, such as where more than two cell groups are configured for the UE 120, the base station 110 may be permitted to configure overbooking in various cell groups configured for the UE. For example, the base station 110 may be permitted to overbook all cell groups configured for the UE 120. In this case, the base station 110 is permitted to configure the UE 120 to perform a quantity of blind decodes in cells of any cell group such that the quantity of blind decodes in a cell group exceeds or is not supported by the PDCCH blind decode limit for the cell group. Moreover, the base station 110 is permitted to configure the UE 120 to process a quantity of control channel elements in cells of any cell group such that the quantity of control channel elements in the cell group exceeds or is not supported by the PDCCH control channel element limit for the cell group.

As another example, the base station 110 may be permitted to overbook only the master cell groups configured for the UE 120. In this case, the base station 110 is permitted to configure the UE 120 to perform a quantity of blind decodes in cells of a master cell group such that the quantity of blind decodes in the master cell group exceeds or is not supported by the PDCCH blind decode limit for the master cell group. Moreover, the base station 110 is permitted to configure the UE 120 to process a quantity of control channel elements in cells of a master cell group such that the quantity of control channel elements in the master cell group exceeds or is not supported by the PDCCH control channel element limit for the master cell group.

As another example, the base station 110 may be permitted to indicate to the UE 120 which cell groups are to be overbooked. In this case, the base station 110 is permitted to configure the UE 120 to perform a quantity of blind decodes in cells of the specified cell group(s) such that the quantity of blind decodes in the specified cell group(s) exceeds or is not supported by the PDCCH blind decode limit for the specified cell group(s). Moreover, the base station 110 is permitted to configure the UE 120 to process a quantity of control channel elements in cells of the specified cell group(s) such that the quantity of control channel elements in the specified cell group(s) exceeds or is not supported by the PDCCH control channel element limit for the specified cell group(s).

In some aspects, the base station 110 may not be permitted to overbook any cell groups configured for the UE 120. In this case, the base station 110 is not permitted to configure the UE 120 to perform a quantity of blind decodes in any cell group such that the quantity of blind decodes in the cell group exceeds or is not supported by the PDCCH blind decode limit for the cell group. Moreover, the base station 110 is not permitted to configure the UE 120 to process a quantity of control channel elements in any cell group such that the quantity of control channel elements in the cell group exceeds or is not supported by the PDCCH control channel element limit for the cell group.

In some aspects, the base station 110 may be permitted to overbook particular cells of the cell group, such as only primary cells, only secondary cells, or a combination of primary cells and secondary cells. In this case, the base station 110 is permitted to configure the UE 120 to perform a quantity of blind decodes in particular cells of a cell group such that the quantity of blind decodes in the cell group exceeds or is not supported by the PDCCH blind decode limit for particular cells of the cell group. Moreover, the base station 110 is permitted to configure the UE 120 to process a quantity of control channel elements in particular cells of a cell group such that the quantity of control channel elements in the particular cells of cell group exceeds or is not supported by the PDCCH control channel element limit for the particular cells of cell group.

Figure 4:
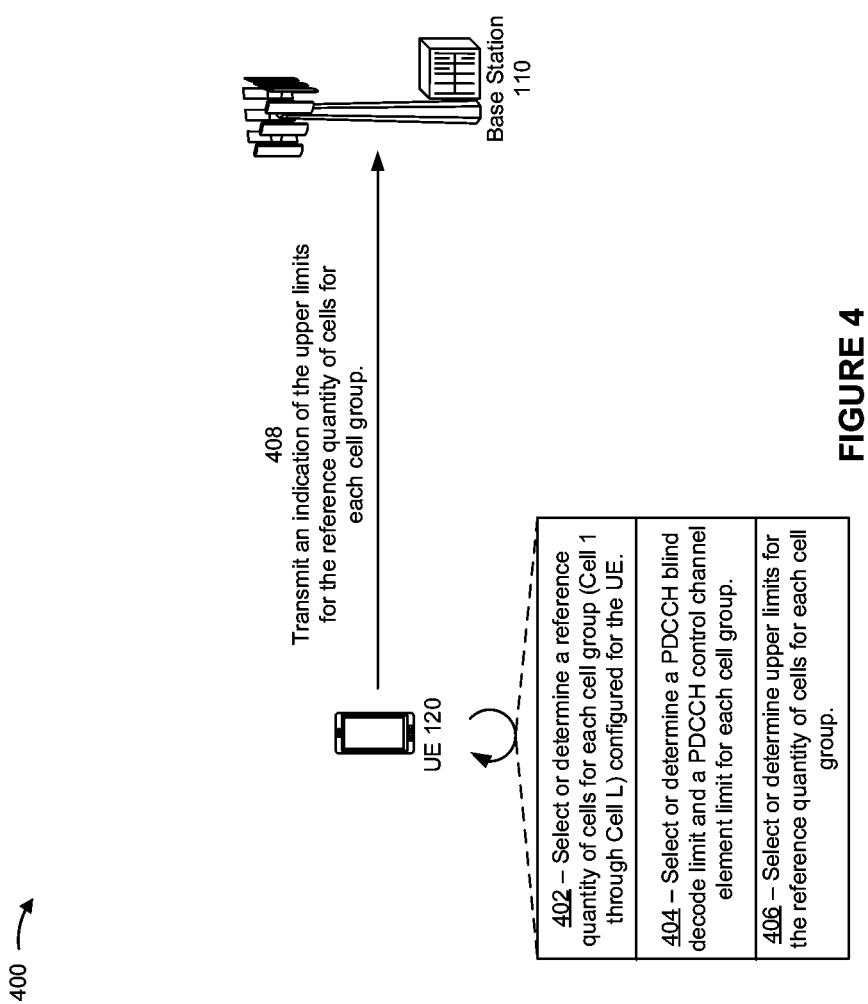

FIG. 4 is a diagram illustrating one or more examples 400 of identifying PDCCH parameters for multiple cell groups. As shown in FIG. 4, example(s) 400 may include communication between a UE 120 (such as the UEs 120a-120e depicted and described in FIG. 1 or the UE 120 depicted and described in FIG. 2) and a base station 110 (such as the BSs 110a-110d depicted and described in FIG. 1 or the BS 110 depicted in FIG. 2). The UE 120 and the base station 110 may be included in a wireless network, such as wireless network 100. In some aspects, the UE 120 may be capable of being deployed in an NR multi-connectivity configuration. For example, the UE 120 may be configured with more than two cell groups, such as one or more master cell groups and a plurality of secondary cell groups. Each cell group may include one or more cells, such as one or more primary cells and one or more secondary cells. In some aspects, the cells within each cell group configured for the UE 120 may be time synchronous within each cell group, may be time asynchronous across two or more cell groups, or combinations thereof.

As shown in FIG. 4, and by reference number 402, the UE 120 may determine a reference quantity (or reference number) of cells $N_i$ for PDCCH blind detection for each cell group $CG_i$ of Cell Group 1 through Cell Group L configured for the UE 120. Determining the reference quantity (or reference number) of cells may include selecting the determine a reference quantity (or reference number) of cells. The reference quantity of cells for a cell group may be the quantity of cells that the UE 120 is to use to determine or select a PDCCH blind detection limit for the cell group, a PDCCH control channel element limit, for the cell group, or a combination thereof. In some aspects, the reference quantity of cells may be the same for each cell group configured for the UE 120 or may be different for at least a subset of the cell groups.

In some aspects, the UE 120 may determine the reference quantity of cells for a cell group by selecting the reference quantity of cells from a cell quantity range configured for the UE 120 (for example, a range of [1, . . . , 15] cells). In some aspects, the UE 120 (or the base station 110) may determine or select the reference quantity of cells for each cell group such that Equation 1 is satisfied:

$$\sum_{i=0}^{N_L-1} N_i \le Y \qquad \text{Equation 1}$$

where $N_L$ is the quantity of cell groups configured for the UE 120 (or the quantity of activated cell groups among the total quantity of cell groups configured for the UE 120) and Y is either a PDCCH blind decoding capability value of the UE 120 (for example, a combined PDCCH blind decode capability value, such as pdcch-BlindDetectionCA, for the UE 120 if reported by the UE 120) or a quantity of downlink serving cells that the UE 120 is capable of supporting across all cell groups configured for the UE 120. In this case, the UE 120 may select or determine the reference quantity of cells for each cell group such that a summation of the reference quantities of cells for each cell group is less than or equal to the combined PDCCH blind decode capability value, or the quantity of downlink serving cells configured across all cell groups for the UE 120. In some aspects, the UE 120 may select or determine the combined PDCCH blind decode capability value using one or more of the techniques described above in connection with FIG. 3 as well as other techniques.

As further shown in FIG. 4, and by reference number 404, the UE 120 may determine a PDCCH blind decode limit and a PDCCH control channel element limit for each cell group configured for the UE 120 associated with or based at least in part on the reference quantity of cells selected or determined for each cell group. Determining the PDCCH blind decode limit and the PDCCH control channel element limit may include selecting the PDCCH blind decode limit and the PDCCH control channel element limit. In this case, the UE 120 may select or determine a PDCCH blind decode limit and a PDCCH control channel element limit for a cell group associated with or based at least in part on the reference quantity of calls selected or determined for the cell group. In some aspects, the UE 120 may select or determine the PDCCH blind decode limit and the PDCCH control channel element limit for each cell group configured for the UE 120 associated with or based at least in part on selecting or determining the reference quantity of cells for each cell group.

As shown in FIG. 4, and by reference number 406, the UE 120 may select or determine an upper limit $N_{i,cap}$ for the reference quantity of cells $N_i$ for each cell group $CG_i$ of Cell Group 1 through Cell Group L configured for the UE 120. The upper limit for a cell group may be a maximum quantity of cells that the UE 120 is capable of supporting as the reference quantity of cells for the cell group. In some aspects, the upper limit may be the same for each cell group configured for the UE 120 or may be different for at least a subset of the cell groups.

In some aspects, the UE 120 may select or determine the upper limit for a reference quantity of cells for a cell group by selecting the upper limit from an upper limit range of [1, . . . , X−1] cells configured for the UE 120. X may correspond to the PDCCH blind decoding capability value of the UE 120 (for example, the combined PDCCH blind decode capability value, such as pdcch-BlindDetectionCA for the UE 120 for carrier aggregation with more than four configured cells) if reported by the UE 120, or may be a configurable or specified value if the UE 120 does not select, determine, or report the combined PDCCH blind decode capability value to the base station 110. In some aspects, the UE 120 may select or determine the upper limits for the reference quantity of cells for each cell group such that Equation 2 is satisfied:

$$\sum_{i=0}^{N_L-1} N_{i,cap} \geq Z \qquad \text{Equation 2}$$

where $N_L$ is the quantity of cell groups configured for the UE 120 (or the quantity of activated cell groups among the total quantity of cell groups configured for the UE 120) and Z is either the combined PDCCH blind decoding capability value of the UE 120 or a quantity of downlink serving cells that the UE 120 is capable of supporting across all cell groups configured for the UE 120. In this case, the UE 120 may select or determine the upper limits for the reference quantity of cells for each cell group such that a summation of the upper limits for the reference quantity of cells for each cell group is greater than or equal to the combined PDCCH blind decode capability value, or the quantity of downlink serving cells that the UE 120 is capable of supporting across all cell groups configured for the UE 120.

As further shown in FIG. 4, and by reference number 408, the UE 120 may transmit, to the base station 110 an indication of the upper limits for the reference quantity of cells for each cell group configured for the UE 120. In some aspects, the UE 120 may transmit the indication of the upper limits for the reference quantity of cells for each cell group associated with or based at least in part on selecting or determining the upper limits. In some aspects, the combined PDCCH blind decode limit and the combined PDCCH control channel element limit may be used in various scenarios, such as in a soft handover or a make-before-break handover, where the UE 120 is simultaneously communicatively connected with one or more source cell groups and one or more target cell groups.

FIG. 5 is a diagram illustrating an example process 500 performed, for example, by a UE, in accordance with various aspects of the present disclosure. The example process 500 shows where a base station (such as the UEs 120*a*-120*e* depicted and described in FIG. 1, the UE 120 depicted and described in FIG. 2, or the UE 120 depicted and described in FIG. 3) performs operations associated with identifying PDCCH parameters for multiple cell groups.

As shown in FIG. 5, in some aspects, the process 500 may include identifying a PDCCH blind decode capability value for the UE and a PDCCH control channel element capability value for the UE (block 510). For example, the UE (using receive processor 258, transmit processor 264, controller/processor 280, memory 282, or a combination thereof) may identify a PDCCH blind decode capability value for the UE and a PDCCH control channel element capability value for the UE.

As shown in FIG. 5, in some aspects, the process 500 may include determining a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE (block 520). For example, the UE (using receive processor 258, transmit processor 264, controller/processor 280, memory 282, or a combination thereof) may determine a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE. Determining the PDCCH blind decode limit and the PDCCH control channel element limit may include selecting the PDCCH blind decode limit and the PDCCH control channel element limit.

The process 500 may include additional aspects, such as any single aspect or any combination of aspects described below or in connection with one or more other processes described elsewhere herein.

In a first aspect, the UE is configured with a plurality of cell groups that includes a master cell group and a secondary cell group. In a second aspect, alone or in combination with the first aspect, the UE is configured with a plurality of cell groups that includes a master cell group and a plurality of secondary cell groups. In a third aspect, alone or in combination with one or more of the first or second aspects, process 500 includes transmitting a single PDCCH blind decode capability value across a plurality of frequency ranges in each cell group.

In a fourth aspect, alone or in combination with one or more of the first through third aspects, the UE is configured with a plurality of cell groups that includes a master cell group and at least two secondary cell groups, and process 500 includes transmitting a respective PDCCH blind decode capability value for each of a plurality of frequency ranges in each cell group. In a fifth aspect, alone or in combination with one or more of the first through fourth aspects, process 500 includes transmitting a respective PDCCH blind decode capability value for each of a plurality of frequency ranges, where in each of the plurality of frequency ranges the UE is configured with at least one downlink serving cell included in a cell group of a plurality of cell groups configured for the UE, each respective PDCCH blind decode capability value for each of the plurality of frequency ranges is a same PDCCH blind decode capability value, and the same PDCCH blind decode capability value is to be used across all frequency ranges in the cell group.

In a sixth aspect, alone or in combination with one or more of the first through fifth aspects, the UE is configured with a plurality of cell groups that includes a master cell group and a plurality of secondary cell groups, and cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit. In a seventh aspect, alone or in combination with one or more of the first through sixth aspects, the UE is configured with a plurality of cell groups that includes a master cell group and a plurality of secondary cell groups, and only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit. In an eighth aspect, alone or in combination with one or more of the first through seventh aspects, only a primary cell of the master cell group is permitted to be configured with a quantity of PDCCHs that corresponds to a quantity of blind decodes that exceeds the PDCCH blind decode limit or a quantity of control channel elements that exceeds the PDCCH control channel element limit.

In a ninth aspect, alone or in combination with one or more of the first through eighth aspects, the UE is configured with a plurality of cell groups that includes a master cell group and a plurality of secondary cell groups, and the master cell group and the plurality of secondary cell groups are not permitted to be configured with a quantity of PDCCHs that corresponds to a quantity of blind decodes that exceeds the PDCCH blind decode limit or a quantity of control channel elements that exceeds the PDCCH control channel element limit. In a tenth aspect, alone or in combination with one or more of the first through ninth aspects, the UE is configured with a plurality of cell groups that includes a master cell group and a plurality of secondary cell groups, and process 500 includes receiving an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

FIG. 6 is a diagram illustrating an example process 600 performed, for example, by a UE, in accordance with various aspects of the present disclosure. The example process 600 shows where a base station (such as the UEs 120a-120e depicted and described in FIG. 1, the UE 120 depicted and described in FIG. 2, or the UE 120 depicted and described in FIG. 4) performs operations associated with identifying PDCCH parameters for multiple cell groups.

As shown in FIG. 6, in some aspects, the process 600 may include determining a respective reference quantity of cells for each cell group configured for the UE, where the UE is configured with more than two cell groups (block 610). For example, the UE (using receive processor 258, transmit processor 264, controller/processor 280, memory 282, or a combination thereof) may select or determine a respective reference quantity of cells for each cell group configured for the UE. In some aspects, the UE is configured with more than two cell groups.

As shown in FIG. 6, in some aspects, the process 600 may include determining a respective PDCCH blind decode limit and a respective PDCCH control channel element limit for each cell group configured for the UE, associated with the respective reference quantity of cells for each cell group configured for the UE (block 620). For example, the UE (using receive processor 258, transmit processor 264, controller/processor 280, memory 282, or a combination thereof) may determine a respective PDCCH blind decode limit and a respective PDCCH control channel element limit for each cell group configured for the UE, associated with the respective reference quantity of cells for each cell group configured for the UE. Determining the respective PDCCH blind decode limit and the respective PDCCH control channel element limit may include selecting the respective PDCCH blind decode limit and the respective PDCCH control channel element limit.

The process 600 may include additional aspects, such as any single aspect or any combination of aspects described below or in connection with one or more other processes described elsewhere herein.

In a first aspect, process 600 includes transmitting an indication of a respective upper limit for the respective reference quantity of cells for each cell group configured for the UE. In a second aspect, alone or in combination with the first aspect, determining the respective upper limit for the respective reference quantity of cells for each cell group configured for the UE includes selecting the respective upper limit for the reference quantity of cells for each cell group from an upper limit range configured for the UE, where the upper limit range is associated with a combined PDCCH blind decode capability value if reported by the UE for carrier aggregation with more than four configured cells, otherwise the upper limit range is associated with a specified value.

In a third aspect, alone or in combination with one or more of the first or second aspects, determining the respective upper limit for the respective reference quantity of cells for each cell group configured for the UE includes determining the respective upper limit for the respective reference quantity of cells for each cell group configured for the UE such that a summation of the respective upper limits for the respective reference quantity of cells for each cell group is greater than or equal to a combined PDCCH blind decode capability value for the UE or a quantity of downlink serving cells that the UE is capable of supporting across all cell groups configured for the UE. In a fourth aspect, alone or in combination with one or more of the first through third aspects, determining the respective reference quantity of cells for each cell group configured for the UE includes selecting the respective reference quantity of cells for each cell group from a cell quantity range specified for the UE.

In a fifth aspect, alone or in combination with one or more of the first through fourth aspects, determining the respective reference quantity of cells for each cell group configured for the UE includes determining the respective reference quantity of cells for each cell group such that a summation of the respective reference quantities of cells for each cell group is less than or equal to a combined PDCCH blind decode capability value for the UE or a quantity of downlink serving cells configured for the UE across all cell groups configured for the UE. In a sixth aspect, alone or in combination with one or more of the first through fifth aspects, cells included in a set of cells configured for the UE are time synchronous within the cell set.

In a seventh aspect, alone or in combination with one or more of the first through sixth aspects, cells included in a set of cells configured for the UE are time asynchronous with cells included in a second set of cells configured for the UE. In an eighth aspect, alone or in combination with one or more of the first through seventh aspects, the respective PDCCH blind decode limit for each cell set configured for the UE are associated with the reference quantity of cells and an upper limit of the reference quantity of cells defined for a cell group, and the respective PDCCH control channel element limit for each cell set configured for the UE are associated with the reference quantity of cells and the upper limit of the reference quantity of cells defined for a cell group. In a ninth aspect, alone or in combination with one or more of the first through eighth aspects, the PDCCH blind decode limit and the PDCCH control channel element limit for a cell group are for a set of cells during a handover procedure of the UE when the UE is simultaneously connected to more than two set of groups.

FIG. 7 is a diagram illustrating an example process 700 performed, for example, by a BS. The example process 700 shows where a base station (such as the BSs 110a-110d depicted and described in FIG. 1, the BS 110 depicted and described in FIG. 2, or the BS 110 depicted and described in FIG. 3) performs operations associated with identifying PDCCH parameters for multiple cell groups.

As shown in FIG. 7, in some aspects, the process 700 may include receiving a PDCCH blind decode capability value for the UE and a PDCCH control channel element capability value for the UE (block 710). For example, the BS (fusing receive processor 238, transmit processor 220, controller/processor 240, memory 242, or a combination thereof) may receive a PDCCH blind decode capability value for the UE and a PDCCH control channel element capability value for the UE.

As shown in FIG. 7, in some aspects, the process 700 may include determining a PDCCH blind decode limit and a PDCCH control channel element limit for the UE associated with the PDCCH blind decode capability value, the PDCCH control channel element capability value, and a quantity of cell groups configured for the UE or a quantity of the cell groups that are activated for the UE (block 720). For example, the BS (using receive processor 238, transmit processor 220, controller/processor 240, memory 242, or a combination thereof) may determine a PDCCH blind decode limit and a PDCCH control channel element limit for the UE associated with the PDCCH blind decode capability value, the PDCCH control channel element capability value, and a quantity of cell groups configured for the UE or a quantity of the cell groups that are activated for the UE. Determining the PDCCH blind decode limit and the PDCCH control channel element limit may include selecting the PDCCH blind decode limit and the PDCCH control channel element limit.

The process 700 may include additional aspects, such as any single aspect or any combination of aspects described below or in connection with one or more other processes described elsewhere herein.

In a first aspect, the UE is configured with a plurality of cell groups that includes a master cell group and a secondary cell group. In a second aspect, alone or in combination with the first aspect, the UE is configured with a plurality of cell groups that includes a master cell group and a plurality of secondary cell groups. In a third aspect, alone or in combination with one or more of the first or second aspects, process 700 includes receiving, from the UE, a single PDCCH blind decode capability value across a plurality of frequency ranges in each cell group.

In a fourth aspect, alone or in combination with one or more of the first through third aspects, the UE is configured with a plurality of cell groups that includes a master cell group and at least two secondary cell groups, and process 700 includes receiving, from the UE, a respective PDCCH blind decode capability value for each of a plurality of frequency ranges in each cell group. In a fifth aspect, alone or in combination with one or more of the first through fourth aspects, process 700 includes receiving, from the UE, a respective PDCCH blind decode capability value for each of a plurality of frequency ranges, where in each of the plurality of frequency ranges the UE is configured with at least one downlink serving cell included in a cell group of a plurality of cell groups configured for the UE, each respective PDCCH blind decode capability value for each of the plurality of frequency ranges is a same PDCCH blind decode capability value, and the same PDCCH blind decode capability value is to be used across all frequency ranges in the cell group.

In a sixth aspect, alone or in combination with one or more of the first through fifth aspects, the UE is configured with a plurality of cell groups that includes a master cell group and a plurality of secondary cell groups, and cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit. In a seventh aspect, alone or in combination with one or more of the first through sixth aspects, the UE is configured with a plurality of cell groups that includes a master cell group and a plurality of secondary cell groups, and only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit. In an eighth aspect, alone or in combination with one or more of the first through seventh aspects, only a primary cell of the master cell group is permitted to be configured with a quantity of PDCCHs that corresponds to a quantity of blind decodes that exceeds the PDCCH blind decode limit or a quantity of control channel elements that exceeds the PDCCH control channel element limit.

In a ninth aspect, alone or in combination with one or more of the first through eighth aspects, the UE is configured with a plurality of cell groups that includes a master cell group and a plurality of secondary cell groups, and the master cell group and the plurality of secondary cell groups are not permitted to be configured with a quantity of PDCCHs that corresponds to a quantity of blind decodes that exceeds the PDCCH blind decode limit or a quantity of control channel elements that exceeds the PDCCH control channel element limit. In a tenth aspect, alone or in combination with one or more of the first through ninth aspects, the UE is configured with a plurality of cell groups that includes a master cell group and a plurality of secondary cell groups, and process 700 includes transmitting, to the UE, an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

The following provides an overview of aspects of the present disclosure:

Aspect 1: A method of wireless communication performed by an apparatus of a UE, including: identifying a PDCCH blind decode capability value and a PDCCH control channel element capability value; and determining a PDCCH blind decode limit and a PDCCH control channel element limit associated with the PDCCH blind decode capability value, the PDCCH control channel element capability value, and a quantity of cell groups configured for the UE or a quantity of the cell groups that are activated for the UE.

Aspect 2: The method of aspect 1, where the UE is configured with a plurality of cell groups that includes: an MCG and an SCG. Aspect 3: The method of aspect 1, where the UE is configured with a plurality of cell groups that includes: a master cell group (MCG), and a plurality of SCGs. Aspect 4: The method of any of aspects 1-3, further including: transmitting a single PDCCH blind decode capability value across a plurality of frequency ranges in each cell group. Aspect 5: The method of aspect 1, where the UE is configured with a plurality of cell groups that includes: a MCG, and at least two SCGs; and where the method further includes: transmitting a respective PDCCH blind decode capability value for each of a plurality of frequency ranges in each cell group.

Aspect 6: The method of any of aspects 1-6, further including: transmitting a respective PDCCH blind decode capability value for each of a plurality of frequency ranges, where in each of the plurality of frequency ranges the UE is configured with at least one downlink serving cell included in a cell group of a plurality of cell groups configured for the UE, where each respective PDCCH blind decode capability value for each of the plurality of frequency ranges is a same PDCCH blind decode capability value, and where the same PDCCH blind decode capability value is to be used across all frequency ranges in the cell group. Aspect 7: The method of aspect 1, where the UE is configured with a plurality of cell groups that include: an MCG, and a plurality of SCGs; and where cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Aspect 8: The method of aspect 1, where the UE is configured with a plurality of cell groups that includes: an MCG, and a plurality of SCGs; and where only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit. Aspect 9: The method of aspect 1, where only a primary cell of a MCG is permitted to be configured with a quantity of PDCCHs that corresponds to a quantity of blind decodes that exceeds the PDCCH blind decode limit or a quantity of control channel elements that exceeds the PDCCH control channel element limit.

Aspect 10: The method of aspect 1, where the UE is configured with a plurality of cell groups that includes: an MCG, and a plurality of SCGs; and where the master cell group and the plurality of secondary cell groups are not permitted to be configured with a quantity of PDCCHs that correspond to a quantity of blind decodes that exceeds the PDCCH blind decode limit or a quantity of control channel elements that exceeds the PDCCH control channel element limit. Aspect 11: The method of aspect 1, where the UE is configured with a plurality of cell groups that includes: an MCG, and a plurality of SCGs; and where the method further includes: receiving an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Aspect 12: A method of wireless communication performed by an apparatus of a UE, including: determining a respective reference quantity of cells for each cell group configured for the UE, where the UE is configured with more than two cell groups; and determining a respective PDCCH blind decode limit and a respective PDCCH control channel element limit for each cell group configured for the UE, associated with the respective reference quantity of cells for each cell group configured for the UE.

Aspect 13: The method of aspect 12, further including: transmitting an indication of a respective upper limit for the respective reference quantity of cells for each cell group configured for the UE. Aspect 14: The method of aspect 13, where determining the respective upper limit for the respective reference quantity of cells for each cell group configured for the UE includes: selecting the respective upper limit for the reference quantity of cells for each cell group from an upper limit range configured for the UE, where the upper limit range is associated with a combined PDCCH blind decode capability value if reported by the UE for carrier aggregation with more than four configured cells, otherwise the upper limit range is associated with a specified value.

Aspect 15: The method of aspect 13, where determining the respective upper limit for the respective reference quantity of cells for each cell group configured for the UE includes: determining the respective upper limit for the respective reference quantity of cells for each cell group configured for the UE such that a summation of the respective upper limits for the respective reference quantity of cells for each cell group is greater than or equal to: a combined PDCCH blind decode capability value for the UE, or a quantity of downlink serving cells that the UE is capable of supporting across all cell groups configured for the UE. Aspect 16: The method of any of aspects 12-15, where determining the respective reference quantity of cells for each cell group configured for the UE includes: selecting the respective reference quantity of cells for each cell group from a cell quantity range specified for the UE.

Aspect 17: The method of any of aspects 12-15, where determining the respective reference quantity of cells for each cell group configured for the UE includes: determining the respective reference quantity of cells for each cell group such that a summation of the respective reference quantities of cells for each cell group is less than or equal to: a combined PDCCH blind decode capability value for the UE, or a quantity of downlink serving cells configured for the UE across all cell groups configured for the UE. Aspect 18: The method of any of aspects 12-17, where cells included in a set of cells configured for the UE are time synchronous within the cell set.

Aspect 19: The method of any of aspects 12-17, where cells included in a first set of cells configured for the UE are time asynchronous with cells included in a second set of cells configured for the UE. Aspect 20: The method of any of aspects 12-19, where the respective PDCCH blind decode limit for each cell set configured for the UE are based at least in part on the reference quantity of cells and an upper limit of the reference quantity of cells defined for a cell group, and where the respective PDCCH control channel element limit for each cell set configured for the UE are associated with the reference quantity of cells and the upper limit of the reference quantity of cells defined for a cell group. Aspect 21: The method of any of aspects 12-20, where the PDCCH blind decode limit and the PDCCH control channel element limit for a cell group are for a set of cells during a handover procedure of the UE when the UE is simultaneously connected to more than two set of groups.

Aspect 22: A method of wireless communication performed by an apparatus of a BS, includes: receiving a PDCCH blind decode capability value and a PDCCH control channel element capability value for a UE; and determining a PDCCH blind decode limit and a PDCCH control channel element limit for the UE associated with the PDCCH blind decode capability value, the PDCCH control channel element capability value, and: a quantity of cell groups configured for the UE, or a quantity of the cell groups that are activated for the UE.

Aspect 23: The method of aspect 22, where the UE is configured with a plurality of cell groups that includes: an MCG and an SCG. Aspect 24: The method of aspect 22, where the UE is configured with a plurality of cell groups that includes: an MCG and a plurality of SCG. Aspect 25: The method of any of aspects 22-24, where receiving the PDCCH blind decode capability value and the PDCCH control channel element capability value includes: receiving, from the UE, an indication of a single PDCCH blind decode capability value across a plurality of frequency ranges in each cell group.

Aspect 26: The method of aspect 22, where the UE is configured with a plurality of cell groups that includes: an MCG and at least two SCGs; and where receiving the PDCCH blind decode capability value and the PDCCH control channel element capability value includes: receiving, from the UE, a respective PDCCH blind decode capability value for each of a plurality of frequency ranges in each cell group. Aspect 27: The method of any of aspects 22-26, where receiving the PDCCH blind decode capability value and the PDCCH control channel element capability value includes: receiving, from the UE, a respective PDCCH blind decode capability value for each of a plurality of frequency ranges, where in each of the plurality of frequency ranges the UE is configured with at least one downlink serving cell included in a cell group of a plurality of cell groups configured for the UE, where each respective PDCCH blind decode capability value for each of the plurality of frequency ranges is a same PDCCH blind decode capability value, and where the same PDCCH blind decode capability value is to be used across all frequency ranges in the cell group.

Aspect 28: The method of aspect 22, where the UE is configured with a plurality of cell groups that includes: an MCG and a plurality of SCGs; and where cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Aspect 29: The method of aspect 22, where the UE is configured with a plurality of cell groups that includes: an MCG and a plurality of SCGs; and where only cells of the master cell group of the plurality of cell groups is permitted to be configured with a quantity of PDCCHs that corresponds to a quantity of blind decodes that exceeds the PDCCH blind decode limit or a quantity of control channel elements that exceeds the PDCCH control channel element limit.

Aspect 30: The method of any of aspects 22-29, where only a primary cell of a master cell group is permitted to be configured with a quantity of PDCCHs that corresponds to a quantity of blind decodes that exceeds the PDCCH blind decode limit or a quantity of control channel elements that exceeds the PDCCH control channel element limit. Aspect 31: The method of aspect 22, where the UE is configured with a plurality of cell groups that includes: an MCG and a plurality of SCGs; and where the master cell group and the plurality of secondary cell groups are not permitted to be configured with a quantity of PDCCHs that correspond to a quantity of blind decodes that exceeds the PDCCH blind decode limit or a quantity of control channel elements that exceeds the PDCCH control channel element limit.

Aspect 32: The method of aspect 22, where the UE is configured with a plurality of cell groups that includes: an MCG and a plurality of SCGs; and where the method further includes: transmitting, to the UE, an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

Aspect 33: An apparatus for wireless communication at a device, including a processor; memory coupled with the processor; and instructions stored in the memory and executable by the processor to cause the apparatus to perform the method of one or more aspects of aspects 1-32. Aspect 34: A device for wireless communication, including a memory and one or more processors coupled to the memory, the memory and the one or more processors configured to perform the method of one or more aspects of aspects 1-32. Aspect 35: An apparatus for wireless communication, including at least one means for performing the method of one or more aspects of aspects 1-32.

Aspect 36: A non-transitory computer-readable medium storing code for wireless communication, the code including instructions executable by a processor to perform the method of one or more aspects of aspects 1-32. Aspect 37: A non-transitory computer-readable medium storing a set of instructions for wireless communication, the set of instructions includes one or more instructions that, when executed by one or more processors of a device, cause the device to perform the method of one or more aspects of aspects 1-32.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    identifying a separate physical downlink control channel (PDCCH) blind decode capability value associated with each of a plurality of frequency ranges in each of at least three cell groups; and
    selecting a PDCCH blind decode limit and a PDCCH control channel element limit in accordance with:
        the separate PDCCH blind decode capability value for at least one frequency range of the plurality of frequency ranges,
        a PDCCH control channel element capability value indicating a quantity of control channel elements that the UE is capable of processing across a set of cell groups, and
        a quantity of cell groups configured or activated for the UE.

2. The method of claim 1, wherein the UE is configured with a plurality of cell groups that comprises:
    a master cell group, and
    a secondary cell group.

3. The method of claim 1, wherein the UE is configured with the at least three cell groups, the at least three cell groups comprising:
    a master cell group, and
    a plurality of secondary cell groups.

4. The method of claim 1, further comprising:
    transmitting the separate PDCCH blind decode capability value, across the plurality of frequency ranges, as a single PDCCH blind decode capability value associated with each of the plurality of frequency ranges.

5. The method of claim 1, further comprising:
    transmitting the separate PDCCH blind decode capability value for each of the plurality of frequency ranges in each of the at least three cell groups.

6. The method of claim 1, further comprising:
    transmitting the separate PDCCH blind decode capability value for each of the plurality of frequency ranges,
        wherein, in each of the plurality of frequency ranges, the UE is configured with at least one downlink serving cell included in a cell group of the at least three cell groups, and
        wherein the separate PDCCH blind decode capability value is to be used across all frequency ranges.

7. The method of claim 1, wherein the UE is configured with the at least three cell groups, the at least three cell groups comprising:
    a master cell group, and
    a plurality of secondary cell groups; and
        wherein cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

8. The method of claim 1, wherein the UE is configured with the at least three cell groups, the at least three cell groups comprising:
    a master cell group, and
    a plurality of secondary cell groups; and
        wherein only a set of one or more cells of the master cell group is permitted to be configured with a quantity of PDCCHs that corresponds to a quantity of blind decodes that exceeds the PDCCH blind decode limit or a quantity of control channel elements that exceeds the PDCCH control channel element limit.

9. The method of claim 1, wherein only a primary cell of a master cell group is permitted to be configured with a quantity of PDCCHs that corresponds to a quantity of blind decodes that exceeds the PDCCH blind decode limit or a quantity of control channel elements that exceeds the PDCCH control channel element limit.

10. The method of claim 1, wherein the UE is configured with the at least three cell groups, the at least three cell groups comprising:
    a master cell group, and
    a plurality of secondary cell groups; and
        wherein the master cell group and the plurality of secondary cell groups are not permitted to be configured with a quantity of PDCCHs that correspond to a quantity of blind decodes that exceeds the PDCCH blind decode limit or a quantity of control channel elements that exceeds the PDCCH control channel element limit.

11. The method of claim 1, wherein the UE is configured with the at least three cell groups, the at least three cell groups comprising:
    a master cell group, and
    a plurality of secondary cell groups; and
        wherein the method further comprises:
            receiving an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

12. A method of wireless communication performed by an apparatus of a network entity, comprising:
    receiving a separate physical downlink control channel (PDCCH) blind decode capability value associated with each of a plurality of frequency ranges in each of at least three cell groups; and
    selecting a PDCCH blind decode limit and a PDCCH control channel element limit for a user equipment (UE) in accordance with:
        the separate PDCCH blind decode capability value for at least one frequency range of the plurality of frequency ranges,
        a PDCCH control channel element capability value indicating a quantity of control channel elements that the UE is capable of processing across a set of cell groups, and
        a quantity of cell groups configured or activated for the UE.

13. The method of claim 12, wherein the UE is configured with a plurality of cell groups that comprises:
    a master cell group, and
    a secondary cell group.

14. The method of claim 12, wherein the UE is configured with the at least three cell groups, the at least three cell groups comprising:
    a master cell group, and
    a plurality of secondary cell groups.

15. The method of claim 12, wherein receiving the separate PDCCH blind decode capability value comprises:
    receiving, from the UE, an indication of the separate PDCCH blind decode capability value, across the plurality of frequency ranges, as a single PDCCH blind decode capability value associated with each of the plurality of frequency ranges.

16. The method of claim 12, wherein receiving the separate PDCCH blind decode capability value comprises:
receiving, from the UE, the separate PDCCH blind decode capability value for each of the plurality of frequency ranges in each of the at least three cell groups.

17. The method of claim 12, wherein receiving the separate PDCCH blind decode capability value comprises:
receiving, from the UE, the separate PDCCH blind decode capability value for each of the plurality of frequency ranges,
wherein, in each of the plurality of frequency ranges, the UE is configured with at least one downlink serving cell included in a cell group of the at least three cell groups.

18. The method of claim 12, wherein the UE is configured the at least three cell groups, the at least three cell groups comprising:
a master cell group, and
a plurality of secondary cell groups; and
wherein cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

19. The method of claim 12, wherein the UE is configured with the at least three cell groups, the at least three cell groups comprising:
a master cell group, and
a plurality of secondary cell groups; and
wherein only a set of one or more cells of the master cell group is permitted to be configured with a quantity of PDCCHs that corresponds to a quantity of blind decodes that exceeds the PDCCH blind decode limit or a quantity of control channel elements that exceeds the PDCCH control channel element limit.

20. The method of claim 12, wherein only a primary cell of a master cell group is permitted to be configured with a quantity of PDCCHs that corresponds to a quantity of blind decodes that exceeds the PDCCH blind decode limit or a quantity of control channel elements that exceeds the PDCCH control channel element limit.

21. The method of claim 12, wherein the UE is configured with the at least three cell groups, the at least three cell groups comprising:
a master cell group, and
a plurality of secondary cell groups; and
wherein the master cell group and the plurality of secondary cell groups are not permitted to be configured with a quantity of PDCCHs that correspond to a quantity of blind decodes that exceeds the PDCCH blind decode limit or a quantity of control channel elements that exceeds the PDCCH control channel element limit.

22. The method of claim 12, wherein the UE is configured with the at least three cell groups, the at least three cell groups comprising:
a master cell group, and
a plurality of secondary cell groups; and
wherein the method further comprises:
transmitting, to the UE, an indication of which cell groups' cells of the master cell group and the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

23. An apparatus of a user equipment (UE) for wireless communication, comprising:
a processing system that includes one or more processors and one or more memories coupled with the one or more processors, the processing system configured to cause the apparatus to:
identify a separate physical downlink control channel (PDCCH) blind decode capability value associated with each of a plurality of frequency ranges in each of at least three cell groups; and
select a PDCCH blind decode limit and a PDCCH control channel element limit in accordance with:
the separate PDCCH blind decode capability value for at least one frequency range of the plurality of frequency ranges,
a PDCCH control channel element capability value indicating a quantity of control channel elements that the UE is capable of processing across a set of cell groups, and
a quantity of cell groups configured for the UE, or a quantity of cell or activated for the UE.

24. The apparatus of claim 23, wherein the UE is configured with the at least three cell groups, the at least three cell groups comprising:
a master cell group, and
at least two secondary cell groups; and
wherein the apparatus further comprises:
an interface configured to output a respective PDCCH blind decode capability value for each of the plurality of frequency ranges in each of the at least three cell groups.

25. The apparatus of claim 23, further comprising:
an interface configured to output the separate PDCCH blind decode capability value for each of the plurality of frequency ranges,
wherein, in each of the plurality of frequency ranges, the UE is configured with at least one downlink serving cell included in a cell group of a plurality of cell groups configured for the UE, and
wherein the separate PDCCH blind decode capability value is to be used across all frequency ranges in the cell group.

26. The apparatus of claim 23, wherein the UE is configured with the at least three cell groups, the at least three cell groups comprising:
a master cell group, and
a plurality of secondary cell groups; and
wherein cells of the master cell group and cells of the plurality of secondary cell groups are permitted to be configured with a quantity of PDCCHs that corresponds to a quantity of blind decodes that exceeds the PDCCH blind decode limit or a quantity of control channel elements that exceeds the PDCCH control channel element limit.

27. An apparatus of a network entity for wireless communication, comprising:
an interface configured to obtain a separate physical downlink control channel (PDCCH) blind decode capability value associated with each of a plurality of frequency ranges in each of at least three cell groups; and a processing system that includes one or more processors and one or more memories coupled with the one or more processors, the processing system configured to cause the apparatus to select a PDCCH blind decode limit and a PDCCH control channel element limit for a user equipment (UE) in accordance with:
the separate PDCCH blind decode capability value for at least one frequency range of the plurality of frequency ranges,
a PDCCH control channel element capability value indicating a quantity of control channel elements that the UE is capable of processing across a set of cell groups, and
a quantity of cell groups configured or activated for the UE.

28. The apparatus of claim 27, wherein the interface, when obtaining the separate PDCCH blind decode capability value, is configured to:
obtain, from the UE, an indication of the separate PDCCH blind decode capability value, across the plurality of frequency ranges, as a single PDCCH blind decode capability value associated with each of the plurality of frequency ranges.

29. The apparatus of claim 27, wherein the UE is configured with the at least three cell groups, the at least three cell groups comprising:
a master cell group, and
at least two secondary cell groups; and
wherein the interface, when obtaining the separate PDCCH blind decode capability, is configured to:
obtain, from the UE, the separate PDCCH blind decode capability value for each of the plurality of frequency ranges in each of the at least three cell groups.

30. The apparatus of claim 27, wherein the interface, when obtaining the separate PDCCH blind decode capability value, is configured to:
obtain, from the UE, the separate PDCCH blind decode capability value for each of the plurality of frequency ranges,
wherein, in each of the plurality of frequency ranges, the UE is configured with at least one downlink serving cell included in a cell group of the at least three cell groups.

* * * * *